(12) United States Patent
Konishi et al.

(10) Patent No.: US 8,737,335 B2
(45) Date of Patent: May 27, 2014

(54) REFERENCE SIGNAL TRANSMISSION SCHEDULING DEVICE AND REFERENCE SIGNAL TRANSMISSION SCHEDULING METHOD

(75) Inventors: Satoshi Konishi, Fujimino (JP); Xiaoqiu Wang, Fujimino (JP); Toshihiko Komine, Fujimino (JP)

(73) Assignee: KDDI Corporation, Tokyo (JP)

( * ) Notice: Subject to any disclaimer, the term of this patent is extended or adjusted under 35 U.S.C. 154(b) by 223 days.

(21) Appl. No.: 13/378,177

(22) PCT Filed: Jun. 14, 2010

(86) PCT No.: PCT/JP2010/003944
§ 371 (c)(1),
(2), (4) Date: Dec. 14, 2011

(87) PCT Pub. No.: WO2010/146824
PCT Pub. Date: Dec. 23, 2010

(65) Prior Publication Data
US 2012/0106489 A1 May 3, 2012

(30) Foreign Application Priority Data

Jun. 19, 2009 (JP) .................................. 2009-146925

(51) Int. Cl.
*H04W 4/00* (2009.01)

(52) U.S. Cl.
USPC ............ 370/329; 370/338; 370/341; 370/348

(58) Field of Classification Search
USPC .................. 370/328, 329, 341, 348; 375/298; 455/69, 450
See application file for complete search history.

(56) References Cited

U.S. PATENT DOCUMENTS

| 8,451,783 | B2 * | 5/2013 | Kim et al. | 370/329 |
| 2006/0040619 | A1 * | 2/2006 | Cho et al. | 455/69 |
| 2008/0049668 | A1 * | 2/2008 | Kakura et al. | 370/329 |
| 2009/0181687 | A1 * | 7/2009 | Tiirola et al. | 455/450 |
| 2009/0185638 | A1 * | 7/2009 | Imamura et al. | 375/298 |

OTHER PUBLICATIONS

3GPP TS 36.211, V8.7.0, Technical Specification Group Radio Access Network; Evolved Universal Terrestrial Radio Access (E-UTRA); Physical Channels and Modulation, (Release 8), May 2005.
Okino et al., A study on SRS parameter configuration in consideration of channel estimation error for E-UTRA uplink, IEICE Technical Report RCS2008-245, pp. 197-202, Mar. 2009 (with English Abstract).
International Search Report from application No. PCT/JP2010/003944 dated Sep. 7, 2010.

* cited by examiner

*Primary Examiner* — Brian D Nguyen
*Assistant Examiner* — Toan Nguyen
(74) *Attorney, Agent, or Firm* — Morgan, Lewis & Bockius LLP

(57) ABSTRACT

A reference signal transmission scheduling device, which performs scheduling on uplink transmission of a reference signal (SRS) from a mobile terminal to a base station in a wireless communication system, is designed to appropriately allocate an SRS transmission resource to the mobile terminal in consideration of the current circumstances of the mobile terminal. Herein, the maximum value of an SRS bandwidth is calculated based on the maximum transmission-enabled power of the mobile terminal, while the minimum value of the SRS bandwidth is calculated based on the mobility of the mobile terminal. Additionally, the SRS bandwidth, which is actually used by the mobile terminal subjected to SRS transmission resource allocation, is determined within the range between the maximum value and the minimum value of the SRS bandwidth.

10 Claims, 10 Drawing Sheets

FIG. 4

100 (ALLOWABLE MOBILITY DETERMINATION TABLE)

| SRS TRANSMISSION INTERVAL T_SRS (UNIT: ms) | SRS BANDWIDTH M_SRS (UNIT: RB) | ALLOWABLE MOBILITY |
|---|---|---|
| 2 | 4 | v_24 |
|  | 8 | v_28 |
|  | 12 | v_212 |
|  | 16 | v_216 |
|  | 24 | v_224 |
|  | 48 | v_248 |
| 5 | 4 | v_54 |
|  | 8 | v_58 |
|  | 12 | v_512 |
|  | 16 | v_516 |
|  | 24 | v_524 |
|  | 48 | v_548 |

FIG. 5

200 (SRS TRANSMISSION SCHEDULING TABLE)

|  |  | SRS TRANSMISSION TIMING OFFSET NUMBER: i_SRS ||||
|---|---|---|---|---|---|
|  |  | 0 | 1 | ..... | T_SRS-1 |
| TRANSMISSION COMB NUMBER: k_c | 0 |  |  |  |  |
|  | 1 |  |  |  |  |

TBL(i_SRS, k_c) ; SUBTABLE
W_SRS(i_SRS, k_c) ; SRS BANDWIDTH SETTING INFORMATION

FIG. 6

| | | CYCLIC SHIFT NUMBER: $k_s$ | |
|---|---|---|---|
| | | 0 | 1 |
| SRS BAND OFFSET NUMBER: $j\_SRS$ | 0 | | |
| | ⋮ | | |
| | $(N\_RB/M\_SRS)-1$ | | |

TBL($i\_SRS$, $k\_c$) (SUBTABLE)

210 (ALLOCATED TERMINAL NUMBER)

FIG. 7

| | SRS BANDWIDTH: $M\_SRS$ (UNIT: RB) | | | | | |
|---|---|---|---|---|---|---|
| SRS BAND OFFSET NUMBER: $j\_SRS$ | 4 | 8 | 12 | 16 | 24 | 48 |
| 0 | 0 | 0 | 0 | 0 | 0 | 0 |
| 1 | 1 | | | | | |
| 2 | 2 | 1 | | | | |
| 3 | 3 | | 1 | | | |
| 4 | 4 | 2 | | 1 | | |
| 5 | 5 | | | | | |
| 6 | 6 | 3 | 2 | | 1 | |
| 7 | 7 | | | | | |
| 8 | 8 | 4 | | 2 | | |
| 9 | 9 | | 3 | | | |
| 10 | 10 | 5 | | | | |
| 11 | 11 | | | | | |

REFERENCE SIGNAL TRANSMISSION SCHEDULING DEVICE AND REFERENCE SIGNAL TRANSMISSION SCHEDULING METHOD

TECHNICAL FIELD

The present invention is applied to a radio base station conducting communication with a plurality of mobile terminals in a radio communication system, and relates to a reference signal transmission scheduling device and a reference signal transmission scheduling method, allocating radio resources, used for transmission of reference signals, to mobile terminals in accordance with predetermined scheduling.

The present application is a national stage of PCT International Application No. PCT/JP2010/003944, filed on Jun. 14, 2010, which claims priority to Japanese Patent Application No. 2009-146925 filed Jun. 19, 2009, the entire content of which is incorporated herein by reference.

BACKGROUND ART

Recently, standardization organizations such as 3GPP (3rd Generation Partnership Project), 3GPP2 (3rd Generation Partnership 2), and IEEE802.16, have been studying new standards for radio communication systems. As successor systems to the third generation (3rd Generation) cellular system, for example, a next generation cellular system (or 3.9G cellular system) such as LTE (Long Term Evolution: standard title "Evolved Universal Terrestrial Radio Access (E-UTRA) ") and UMB (Ultra Mobile Broadband) have been examined. Additionally, the IMT-Advanced system (or the 4G cellular system), regarded as an advancement to the 3.9G cellular system, has been examined.

Some of the foregoing radio communication systems adopt the orthogonal frequency division multiple access (OFDMA) standard. The LTE, UMB, and WiMax (Worldwide Interoperability for Microwave Access), for example, adopt the OFDMA standard. Additionally, the LTE-Advanced and IEEE802.16m, which have been currently examined for the 4G cellular system, adopt the OFDMA standard.

The radio communication system adopting the OFDMA standard (hereinafter, referred to as the "OFDMA system") is able to allocate a plurality of subcarriers, available in frequency bands, to mobile terminals and change the allocation content over time. Therefore, the OFDMA system is able to flexibly allocate two-dimensional radio resources, consisting of frequency components and temporal components, to mobile terminals.

Since frequency resources securing good quality may vary depending on mobile terminals in the frequency selective phasing environment, so that it is necessary to allocate frequency resources securing good quality to mobile terminals in accordance with the frequency scheduling. The frequency scheduling improves throughputs of mobile terminals, whereby it is expected that the entire throughput of the OFDMA system is improved.

The frequency scheduling determines frequency resources allocated to mobile terminals based on qualities of frequency resources in available frequency bands. In general, reference signals included in frequency resources are used to secure quality of frequency resources. The downlink (i.e. a communication link in a direction from a radio base station to a mobile terminal) allows for transmission of reference signals via all the frequency resources in available frequency bands with a radio base station, so that a mobile station demodulates reference signals included in all the frequency resources, thus confirming the quality of all the frequency resources in available frequency bands.

On the other hand, the uplink (i.e. a communication link in a direction from a mobile terminal to a radio base station) allows for utilization of reference signals called sounding reference signals (SRS), for example, disclosed in Non-Patent Document 1. Since the SRS can be transmitted using the entire range of available frequency bands, it is possible to confirm uplink frequency characteristics (i.e. quality per each frequency resource). Non-Patent Document 2 discloses a technology for fixing radio resources used for SRS transmission per each mobile terminal based on the assumption that the number of mobile terminals is fixed.

PRIOR ART DOCUMENT

Non-Patent Document

Non-Patent Document 1: 3GPP TS 36.211, "Evolved Universal Terrestrial Radio Access (E-UTRA); Physical Channels and Modulation (Release 8)"

Non-Patent Document 2: Kenta Okino, Yoshimasa Kusano, "A study On SRS parameter configuration in consideration of channel estimation error for E-UTRA uplink", Singaku-Giho, Vol. 108, No. 445, RCS2008-245, pp. 197-202, March 2009

SUMMARY OF THE INVENTION

Problem to be Solved by the Invention

The foregoing prior arts are designed to allocate fixed radio resources, used for SRS transmission, to mobile terminals without considering the current circumstances of mobile terminals. For this reason, they are unable to appropriately allocate radio resources, used for SRS transmission, to mobile terminals while keeping track of environmental variation of communication occurring in mobile terminals.

Means for Solving the Problem

The present invention is made under the aforementioned circumstances, wherein the present invention aims to provide a reference signal transmission scheduling device and a reference signal transmission scheduling method, enabling appropriate allocation of radio resources, used for SRS transmission, in consideration of the present circumstances of mobile terminals in a radio communication system.

The present invention relates to a reference signal transmission scheduling device that performs scheduling on uplink transmission of a reference signal (SRS) from a mobile terminal to a base station in a radio communication system. This reference signal transmission scheduling device includes a maximum SRS bandwidth determination part that calculates the maximum value of an SRS bandwidth based on the maximum transmission-enabled power of the mobile terminal; a minimum SRS bandwidth determination part that calculates the minimum value of the SRS bandwidth based on the mobility of the mobile terminal; and an SRS transmission resource allocation part that determines the SRS bandwidth, which is actually used by the mobile terminal subjected to SRS transmission resource allocation, within the range between the maximum value and the minimum value of the SRS bandwidth.

The SRS transmission resource allocation part allocates an SRS transmission resource to the mobile terminal only when the SRS bandwidth is defined within the range between the maximum value and the minimum value with respect to the mobile terminal subjected to SRS transmission resource allocation. Additionally, the SRS transmission resource allocation part sequentially selects values of the SRS bandwidth, within the range defined between the maximum value and the minimum value of the SRS bandwidth, in ascending order. Furthermore, the SRS transmission resource allocation part selects a desired SRS transmission resource from among available SRS transmission resources within the range defined between the maximum value and the minimum value of the SRS bandwidth such that the residue of the same SRS transmission resource is minimized.

The reference signal transmission scheduling device further includes an allowable mobility determination table that determines the allowable mobility with respect to a pair of the SRS transmission interval and the SRS bandwidth.

Additionally, the reference signal transmission scheduling device further includes an SRS transmission interval determination part that determines an SRS transmission interval based on the number of mobile terminals whose mobility is below the predetermined mobility threshold. Alternatively, the SRS transmission interval determination part determines the SRS transmission interval based on the ratio and the number of mobile terminals whose mobility is below the predetermined mobility threshold.

The present invention relates to a reference signal transmission scheduling method that performs scheduling on uplink transmission of a reference signal (SRS) from a mobile terminal to a base station in a radio communication system. This reference signal transmission scheduling method implements procedures for calculating the maximum value of an SRS bandwidth based on the maximum transmission-enabled power of the mobile terminal; calculating the minimum value of the SRS bandwidth based on the mobility of the mobile terminal; and determining the SRS bandwidth, which is actually used by the mobile terminal subjected to SRS transmission resource allocation, within the range between the maximum value and the minimum value of the SRS bandwidth.

Additionally, it is possible to create a computer program implementing the reference signal transmission scheduling method.

Effect of the Invention

The present invention is able to appropriately allocate SRS transmission resources to mobile terminals in consideration of the present circumstances of mobile communications in the radio communication system. Additionally, it is possible to effectively utilize radio resources by retaining as many unused SRS transmission resources as possible. Furthermore, it is possible to alleviate an operator's load in the base station by automatically adjusting SRS transmission intervals in consideration of the present circumstances of mobile terminals.

BRIEF DESCRIPTION OF THE DRAWINGS

FIG. 4 An illustration of an example of the content of an allowable mobility determination table shown in FIG. 3.

FIG. 5 An illustration of an example of the content of an SRS transmission scheduling table shown in FIG. 3.

FIG. 6 An illustration of an example of the content of a subtable TBL(i_SRS,k_c) included in the SRS transmission scheduling table shown in FIG. 5.

FIG. 7 An illustration of an SRS band offset number (j_SRS) set per each SRS bandwidth M_SRS.

MODE FOR CARRYING OUT THE INVENTION

Figure 1:
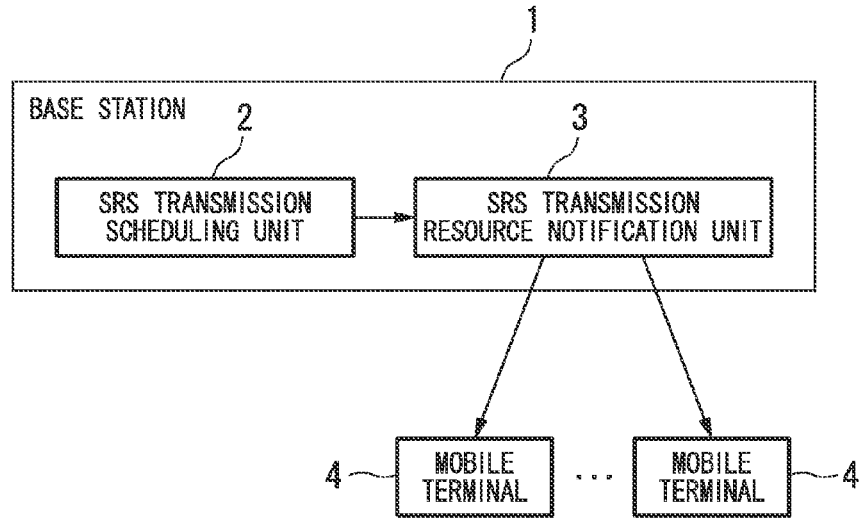
FIG. 1 A block diagram of the overall constitution of an OFDMA system according to a preferred embodiment of the present invention.

FIG. 1 is a block diagram of the overall constitution of an OFDMA system according to the preferred embodiment of the present invention. A base station 1 includes an SRS transmission scheduling unit 2 and an SRS transmission resource notification unit 3. A plurality of mobile terminals 4 performs radio communication via the base station 1. The SRS transmission scheduling unit 2 allocates radio resources which are used when the mobile terminals 4 perform uplink SRS transmission. The SRS transmission resource notification unit 3 notifies the mobile terminals 4 with radio resources used for SRS transmission (hereinafter, referred to as "SRS transmission resources").

Figure 2:
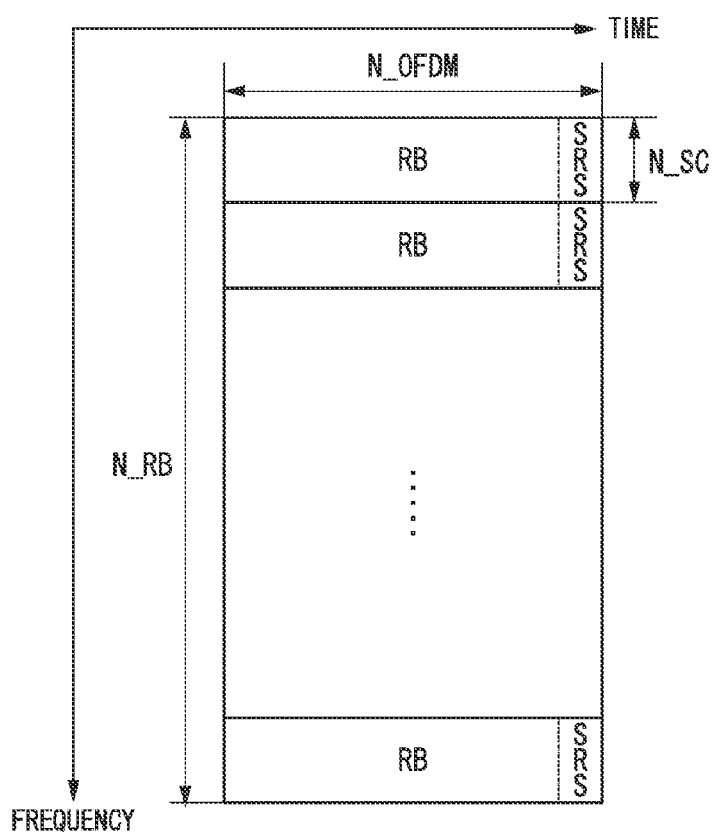
FIG. 2 An illustration of a part of radio resources used in uplink communication in the OFDMA system.

FIG. 2 shows a part of radio resources used for uplink communication with the OFDMA system. Herein, a single SRS transmission is shown in a time direction, whilst available frequency bands of the OFDMA system (hereinafter, referred to as "OFDMA frequency bands") are shown in a frequency direction. A single SRS transmission of radio resources includes N_RB resource blocks (RB), furnished with a predetermined frequency band (subcarrier count: N_SC) and a predetermined time length (OFDMA symbol count: N_OFDMA), which are concatenated in the frequency direction. The entire frequency range of N_RB resource blocks (RB) matches the OFDMA frequency range. In the SRS transmission of resource blocks (RB), a sounding reference signal (SRS) is transmitted with an OFDMA symbol at the last part of each resource block (RB) in the time direction.

The SRS transmission resource of the present embodiment will be described. The SRS transmission resource includes the SRS bandwidth, the SRS transmission interval, the SRS band offset, the SRS transmission timing offset, the cyclic shift (Cyclic Shift), and the transmission comb (Transmission Comb).

The SRS bandwidth is a frequency bandwidth occupied by one sounding reference signal (SRS) and measured in units of resource blocks (RB). The present embodiment employs the OFDMA frequency band of 10 MHz (i.e. 48 RB), wherein it is possible to set six candidates as the SRS bandwidth, e.g. 4 RB, 8 RB, 12 RB, 16 RB, 24 RB, and 48 RB. It is possible to restrict combinations of selectable candidates as the SRS bandwidth. For instance, it is possible to name combinations of selectable candidates as the SRS bandwidth, e.g. "4 RB, 12 RB, 24 RB, 48 RB" and "4 RB, 8 RB, 16 RB, 48 RB". In this connection, an operation is allowed to designate a combination of selectable candidates as the SRS bandwidth.

The SRS transmission interval indicates a time interval with which one mobile terminal 4 performs SRS transmission. The present embodiment determines the SRS transmission interval (i.e. a time length of N_OFDM OFDMA symbols) in milliseconds, wherein it is possible to set eight candidates as the SRS transmission interval, e.g. 2 ms, 5 ms, 10 ms, 20 ms, 40 ms, 80 ms, 160 ms, and 320 ms. In actuality, however, it is necessary to fixedly set one SRS transmission interval. For this reason, the SRS transmission interval may be designated by an operator or automatically set.

The SRS band offset indicates an SRS bandwidth at the start timing of SRS transmission, wherein the SRS band offset is set to the mobile terminals 4, sharing the same SRS bandwidth, in units of the SRS bandwidth. Using the SRS band offset, the mobile terminals 4, simultaneously involved in SRS transmission, are able to conduct SRS transmission by shifting their SRS bands.

The SRS transmission timing offset indicates a temporal position of SRS at the start timing of SRS transmission. The present embodiment can set the SRS transmission timing offset at 0 ms to "SRS transmission interval-1" (in milliseconds). With the SRS transmission timing offset, the mobile terminals 4, sharing the same SRS bandwidth involving SRS transmission, are able to conduct SRS transmission by shifting their SRS transmission time.

A sounding reference signal (SRS) has the same amplitude in both the time direction and the frequency direction and employs the Zadoff-Chu set involving mutually orthogonal code sets which are cyclically shifted. The present embodiment uses two types of cyclic shifts per each sector. With cyclic shifts, it is possible to prevent electromagnetic interference occurring in the mobile terminals 4 sharing the same SRS bandwidth in conducting SRS transmission at the same SRS transmission time. However, the mobile terminals 4 using different SRS bandwidths need to use transmission combs because they cannot provide an electromagnetic interference preventing effect using cyclic shifts.

The transmission comb indicates subcarriers used for SRS transmission. The present embodiment allows the mobile terminals 4 to alternately set their subcarriers used for SRS transmission. For instance, the SRS transmission is carried out using even-numbered subcarriers, or the SRS transmission is carried out using odd-numbered subcarriers. That is, there are provided two types of transmission combs, wherein one type performs SRS transmission using even-numbered subcarriers, whilst the other performs SRS transmission using odd-numbered subcarriers. With transmission combs, it is possible to prevent electromagnetic interference occurring in the mobile terminals 4 sharing the same SRS bandwidth in conducting SRS transmission at the same SRS transmission time. The usage of transmission combs is preferred when the mobile terminals 4 having different SRS bandwidths simultaneously conduct SRS transmission with the same SRS bandwidth at the same SRS transmission time.

Next, the constitution and the operation of the SRS transmission scheduling unit 2 of the present embodiment will be described in detail.

Figure 3:
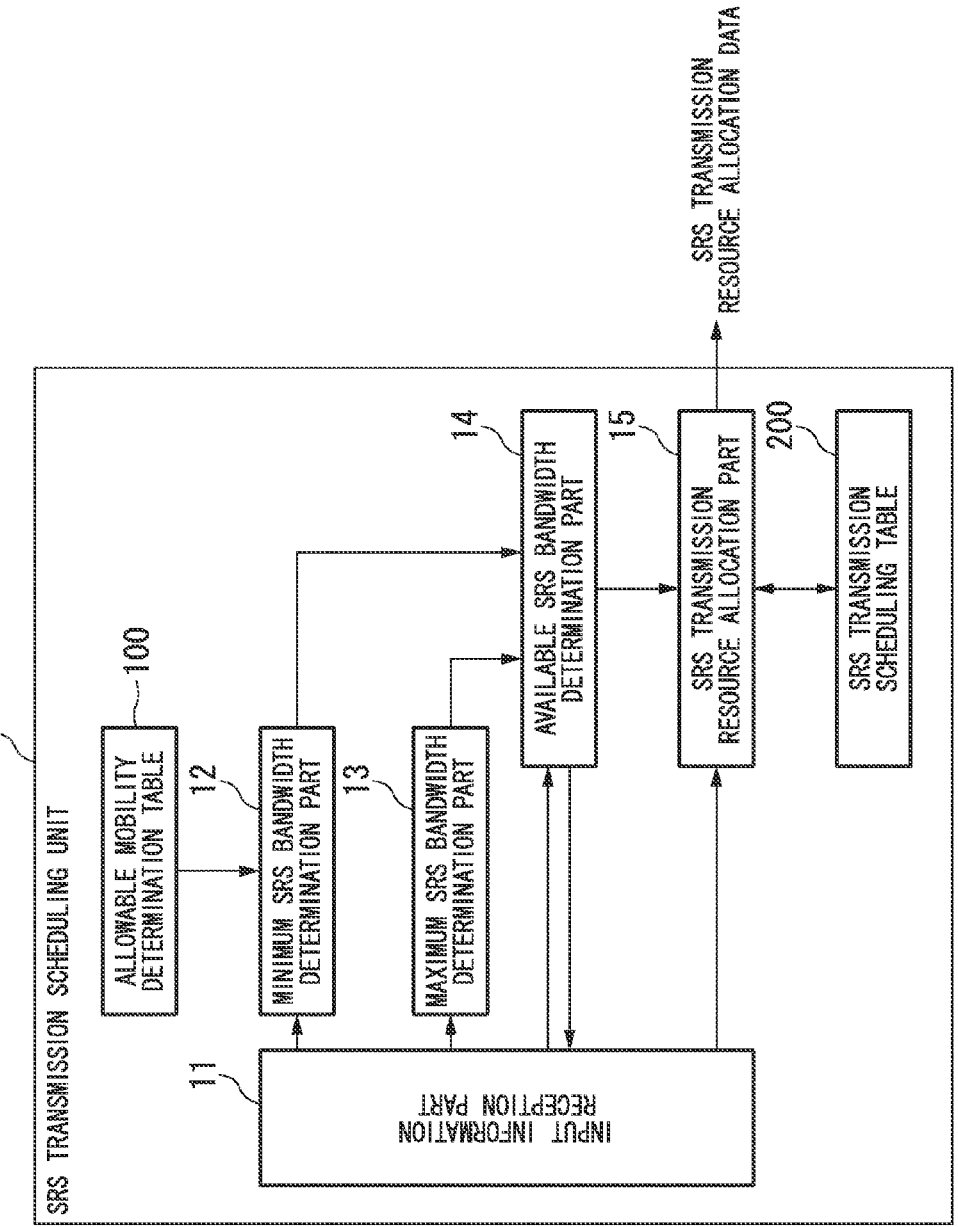
FIG. 3 A block diagram of the constitution of an SRS transmission scheduling unit inside a base station shown in FIG. 1.

FIG. 3 is a block diagram of the constitution of the SRS transmission scheduling unit 2. The SRS transmission scheduling unit 2 includes an input information reception part 11, a minimum SRS bandwidth determination part 12, a maximum SRS bandwidth determination part 13, an available SRS bandwidth determination part 14, an SRS transmission resource allocation part 15, an allowable mobility determination table 100, and an SRS transmission scheduling table 200.

The input information reception part 11 receives various pieces of input information. The input information includes SRS transmission scheduling initiation, terminal numbers of all the mobile terminals 4 subjected to SRS transmission resource allocations, a priority order of SRS transmission resource allocated to the mobile terminals 4 subjected to SRS transmission resource allocations, combinations of selectable candidates of SRS bandwidths, SRS transmission intervals, maximum transmission-enabled powers of the mobile terminals 4, mobility of the mobile terminals 4, or the like.

The minimum SRS bandwidth determination part 12 determines minimum SRS bandwidths based on the mobility of the mobile terminals 4. The maximum SRS bandwidth determination part 13 determines maximum SRS bandwidths based on the maximum transmission-enabled powers of the mobile terminals 4. The available SRS bandwidth determination part 14 determines a range of SRS bandwidths of the mobile terminals 4 based on minimum SRS bandwidths determined by the minimum SRS bandwidth determination part 12 and the maximum SRS bandwidths determined by the maximum SRS bandwidth determination part 13. The SRS transmission resource allocation part 15 determines SRS bandwidths of the mobile terminals 4 based on the range of SRS bandwidths determined by the available SRS bandwidth determination part 14, thus achieving allocation of SRS transmission resources.

The allowable mobility determination table 100 stores data for use in determination of allowable mobility with respect to pairs of SRS transmission intervals and SRS bandwidths. FIG. 4 shows an example of the content of the allowable mobility determination table 100. The allowable mobility determination table 100 stores allowable mobility per each pair of the SRS transmission interval T_SRS (in milliseconds) and the SRS bandwidth M_SRS (in units of RB). Using the allowable mobility determination table 100, it is possible to determine the maximum mobility of the mobile terminal 4 adaptable with a pair of the SRS transmission interval and the SRS bandwidth. For instance, a pair of "T_SRS=2, M_SRS=4" is adaptable to the mobile terminals 4 whose mobility is up to "v_24".

Since the present embodiment employs a fixed SRS transmission interval, it is possible to determine a minimum SRS bandwidth adaptable to the mobile terminal 4 with a certain value of mobility. The minimum SRS bandwidth determination part 12 determines a minimum SRS bandwidth adaptable to the mobile terminal with a certain value of mobility with reference to the allowable mobility determination table 100.

Next, a method of creating the allowable mobility determination table 100 will be described. Since the SRS transmissions aim to acquire frequency characteristics over the entire range of OFDMA frequency bands, the time needed for acquiring frequency characteristics (hereinafter, referred to as "OFDMA frequency characteristic acquiring time") may undergo restriction depending on the mobility of the mobile terminal 4. That is, in the event of the increased mobility of the mobile terminal 4, which undergoes a sharp environmental variation of radio communication due to its increased mobility, the OFDMA frequency characteristic acquiring time thereof needs to be shortened to keep track with such an environmental variation of radio communication. For this reason, it is necessary to set the OFDMA frequency characteristic acquiring time within a coherence time. In this connection, the coherence time is set to a value adequately smaller than the Doppler period depending upon the mobility of the mobile terminal 4.

Additionally, it is necessary to determine an SRS transmission count needed for acquiring frequency characteristics over the entire range of the OFDMA frequency band per each SRS bandwidth. In the case of the SRS bandwidth "M_SRS=4", for example, the SRS transmission count needs to be set to "48/4=12" in order to acquire frequency characteristics over the entire range of the OFDMA frequency band (48 RB). The time needed for implementing the SRS transmission count depends on each SRS transmission interval. In the case of the SRS transmission interval "T_SRS=2" and the SRS bandwidth "M_SRS=4", for example, "2×12−1−23 (ms)" is needed from the first SRS transmission time to the last SRS transmission time. Thus, it is possible to determine the OFDMA frequency characteristic acquiring time per each pair of the SRS transmission interval and the SRS bandwidth.

The allowable mobility per each pair of the SRS transmission interval and the SRS bandwidth is determined based on a restriction to the OFDMA frequency characteristic acquiring time depending on the mobility of the mobile terminal 4 and a restriction to the OFDMA frequency characteristic acquiring time depending on each pair of the SRS transmission interval and the SRS bandwidth.

In general, a time deviation occurs between the SRS transmission resource allocation time and the actual SRS transmission time. It is preferable to determine a restriction to the OFDMA frequency characteristic acquiring time in consideration of the time deviation.

The present invention is designed such that the allowable mobility determination table 100 is created in advance and then incorporated into the SRS transmission scheduling unit 2; but this is not a restriction. That is, it is possible to appropriately calculate a coherence time based on the mobility of the mobile terminal 4, so that a minimum SRS bandwidth is calculated using a predetermined SRS transmission interval such that the OFDMA frequency characteristic acquiring time may fall within the coherence time.

In FIG. 3, the SRS transmission scheduling table 200 stores the allocation result of SRS transmission resources. FIGS. 5 and 6 show an example of the content of the SRS transmission scheduling table 200. FIG. 5 shows the overview content of the SRS transmission scheduling table 200, and FIG. 6 shows the content of a subtable TBL(i_SRS,k_c) included in the SRS transmission scheduling table 200.

In FIG. 5, the SRS transmission scheduling table 200 stores the subtable TBL(i_SRS,k_c) and SRS bandwidth setting information W_SRS(i_SRS,k_c) per each pair of an SRS transmission timing offset number (i_SRS) and a transmission comb number (k_c).

The SRS transmission timing offset number (i_SRS) denotes the number identifying an SRS transmission timing offset, wherein the present embodiment expresses the SRS transmission timing offset (ranging from "0" to "SRS transmission interval (T_SRS)−1" (milliseconds)) with values ranging from "0" to "T_SRS−1".

The transmission comb number (k_c) denotes the number identifying the type of a transmission comb, wherein the present embodiment sets "k_c=0" indicating the SRS transmission with an odd-numbered subcarrier and "k_c=1" indicating the SRS transmission with an odd-numbered subcarrier.

The SRS bandwidth information W_SRS(i_SRS,k_c) denotes the information representing an SRS bandwidth which is set per each pair (i_SRS,k_c) consisting of the SRS transmission timing offset number (i_SRS) and the transmission comb number (k_c). Therefore, the subtable TBL(i_SRS,k_c) corresponding to the pair (i_SRS,k_c) of the SRS transmission timing offset number and the transmission comb number is used for an SRS bandwidth specified by the SRS bandwidth setting information W_SRS(i_SRS,k_c).

In FIG. 6, the subtable TBL(i_SRS,k_c) stores an allocated terminal number 210 per each pair of an SRS band offset number (j_SRS) and a cyclic shift number (k_s).

The SRS band offset number (j_SRS) denotes the number identifying an SRS band offset, wherein the present embodiment employs the number corresponding to an SRS band offset, which is set in units of SRS bandwidths having the same value. FIG. 7 shows the SRS band offset number (j_SRS). In the column of the SRS bandwidth "M_SRS=4", for example, the SRS band offset number (j_SRS) is set per 4 RB in the range from "0" to "11". In the column of the SRS bandwidth "M_SRS=8", the SRS band offset number (j_SRS) is set per 8 RB in the range from "0" to "5". In the column of the SRS bandwidth "M_SRS=12", the SRS band offset number (j_SRS) is set per 12 RB in the range from the 0" to "3". In the column of the SRS bandwidth "M_SRS=16", the SRS band offset number (j_SRS) is set per 16 RB in the range from "0" to "2". In the column of the SRS bandwidth "M_SRS=24", the SRS band offset number (j_SRS) is set per 24 RB to "0" or "1". In the column of the SRS bandwidth "M_SRS=48", the SRS band offset number (j_SRS) is set to "0" alone.

The cyclic shift number (k_s) denotes the number identifying the type of each cyclic shift, wherein the present embodiment sets "0" or "1" in conjunction with two types of cyclic shifts.

The allocated terminal number 210 denotes the terminal number of the mobile terminal 4 allocated with a combination of SRS transmission resources (i.e. the SRS bandwidth, the SRS transmission timing offset, the SRS band offset, the cyclic shift, and the transmission comb).

The SRS transmission resource allocation part 15 stores the allocation result of SRS transmission resources in the SRS transmission scheduling table 200. The SRS transmission resource allocation part 15 sends the allocation result of SRS transmission resources (or SRS transmission resource allocation data), stored in the SRS transmission scheduling table 200, to the SRS transmission resource notification part 3. The SRS transmission resource allocation data has the information with regard to the SRS transmission interval (which is commonly shared by all the mobile terminals 4) and each combination of SRS transmission resources (i.e. the SRS bandwidth, the SRS transmission timing offset, the SRS band offset, the cyclic shift, and the transmission comb) allocated to each mobile terminal 4. Each combination of SRS transmission resources is specified as "M_SRS,i_SRS,j_SRS,k_s, k_c".

Next, an SRS transmission scheduling process executed by the SRS transmission scheduling unit 2 will be described with reference to flowcharts shown in FIGS. 8, 9, and 10.

The SRS transmission scheduling unit 2 starts the SRS transmission scheduling process with a predetermined initiation. The initiation for starting the SRS transmission scheduling process is defined as the timing of each execution period of SRS transmission resource allocation or the timing when the base station 1 newly conducts communication with the mobile terminal 4.

Figure 8:
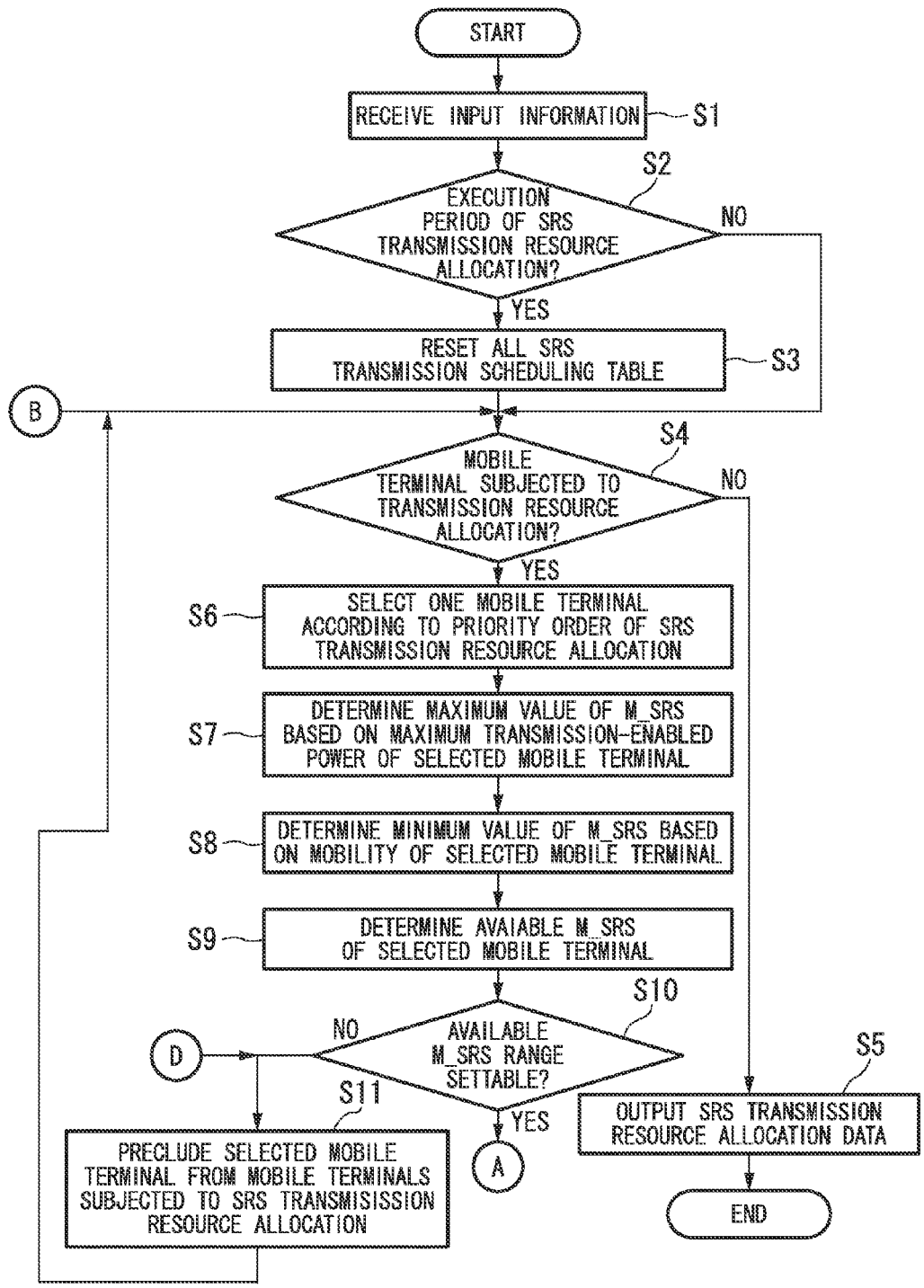
FIG. 8 A flowchart of an SRS transmission scheduling process.

When the SRS transmission scheduling process is started, the input information reception part 11 receives the input information (step S1 in FIG. 8). The input information reception part 11 makes a decision as to whether or not the initiation of the SRS transmission scheduling process corresponds to the execution period of the SRS transmission resource allocation (step S2). When it is determined that the initiation of the SRS transmission scheduling process corresponds to the execution period of the SRS transmission resource allocation, the input information reception part 11 instructs the SRS transmission resource allocation part 15 to reset the SRS transmission scheduling table 200. Thus, the SRS transmission resource allocation part 15 resets all the stored content of the SRS transmission scheduling table 200 (step S3). Then, the flow proceeds to step S4. When the initiation of the SRS transmission scheduling process does not match the execution period of the SRS transmission resource allocation (in other words, when the base station 1 newly starts communicating with the mobile terminal 4), the SRS transmission resource allocation part 15 does not reset the stored content of the SRS transmission scheduling table 200, so that the flow directly proceeds from step S2 to step S4.

In step S4, the input information reception part 11 makes a decision as to whether or not any mobile terminal 4 subjected to the SRS transmission resource allocation exists. When the mobile terminal 4 subjected to the SRS transmission resource allocation exists, the flow proceeds to step S6. On the other hand, when no mobile terminal 4 subjected to the SRS transmission resource allocation exists, the input information reception part 11 instructs the SRS transmission resource allocation part 15 to provide SRS transmission resource allocation data. The SRS transmission resource allocation part 15 creates SRS transmission resource allocation data in accordance with the stored content of the SRS transmission scheduling table 200, thus providing them to the SRS transmission resource notification unit 3 (step S5).

In step S6, the input information reception part 11 selects one mobile terminal 4 from among a plurality of mobile terminals 4, subjected to the SRS transmission resource allocation, in accordance with the priority order of allocating SRS transmission resources.

In step S7, the input information reception part 11 notifies the maximum SRS bandwidth determination part 13 of the maximum transmission-enabled power of the selected mobile terminal 4, thus instructing it to calculate the maximum value of the SRS bandwidth (M_SRS) pertaining to the selected mobile terminal 4. The maximum SRS bandwidth determination part 13 calculates the maximum value of the SRS bandwidth of the selected mobile terminal 4 based on the maximum transmission-enabled power of the selected mobile terminal 4. Since each mobile terminal 4 has a limitation of its transmission power, it is possible to determine the maximum value of the SRS bandwidth (M_SRS) of each mobile terminal 4 based on its maximum transmission-enabled power. The maximum SRS bandwidth determination part 13 notifies the available SRS bandwidth determination part 14 of the maximum value of the SRS bandwidth pertaining to the selected mobile terminal 4.

In step S8, the input information reception part 11 notifies the minimum SRS bandwidth determination part 12 of the SRS transmission interval (T_SRS) and the mobility of the selected mobile terminal 4, thus instructing it to calculate the minimum value of the SRS bandwidth (M_SRS) pertaining to the selected mobile terminal 4. Based on the SRS transmission interval and the mobility of the selected mobile terminal 4, the minimum SRS bandwidth determination part 12 calculates the minimum value of the SRS bandwidth pertaining to the selected mobile terminal 4. At this time, the minimum SRS bandwidth determination part 12 calculates the minimum value of the SRS bandwidth, whose mobility is allowable within the SRS transmission interval, with reference to the allowable mobility determination table 100. The minimum SRS bandwidth determination part 12 notifies the available SRS bandwidth determination part 14 of the minimum value of the SRS bandwidth pertaining to the selected mobile terminal 4.

In step S9, the input information reception part 11 notifies the available SRS bandwidth determination part 14 of combinations of selectable candidates of the SRS bandwidth (M_SRS), thus instructing it to calculate the range of the SRS bandwidth available in the selected mobile terminal 4. Considering combinations of selectable candidates of the SRS bandwidth, the available SRS bandwidth determination part 14 sets the range of the SRS bandwidth based on the minimum value and the maximum value of the SRS bandwidth with respect to the selected mobile terminal 4. The following conditions need to be satisfied to set the range of the SRS bandwidth.

(A) Minimum value≤maximum value in the SRS bandwidth.
(B) A selectable candidate of the SRS bandwidth should exist in the range defined between the minimum value and the maximum value of the SRS bandwidth.

In the case of minimum value>maximum value in the SRS bandwidth, allocation is made using the maximum value of the SRS bandwidth.

In step S10, the available SRS bandwidth determination part 14 makes a decision as to whether or not the range of the SRS bandwidth (M_SRS) available in the selected mobile terminal 4 can be determined. When the range of the available SRS bandwidth can be determined, the available SRS bandwidth determination part 14 notifies the SRS transmission resource allocation part 15 of all the selectable candidates of the SRS bandwidth which exist in the range defined between the minimum value and the maximum value of the SRS bandwidth related to the selected mobile terminal 4. Thus, notified candidates of the available SRS bandwidth are regarded as ones available in the selected mobile terminal 4. The available SRS bandwidth determination part 14 notifies the input information reception part 11 of the likelihood of setting the range of the SRS bandwidth related to the selected mobile terminal 4. Accordingly, the input information reception part 11 notifies the SRS transmission resource allocation part 15 of the terminal number of the selected mobile terminal 4, thus instructing it to allocate SRS transmission resources to the selected mobile terminal 4. Subsequently, the flow proceeds to step S12 shown in FIG. 9.

On the other hand, when it is unlikely to set the range of the available SRS bandwidth (M_SRS), the available SRS bandwidth determination part 14 notifies such an unlikelihood to the input information reception part 11. Thus, the input information reception part 11 precludes the selected mobile terminal 4 from the mobile terminals 4 subjected to the SRS transmission resource allocation. Then, the flow returns back to step S4.

Figure 9:
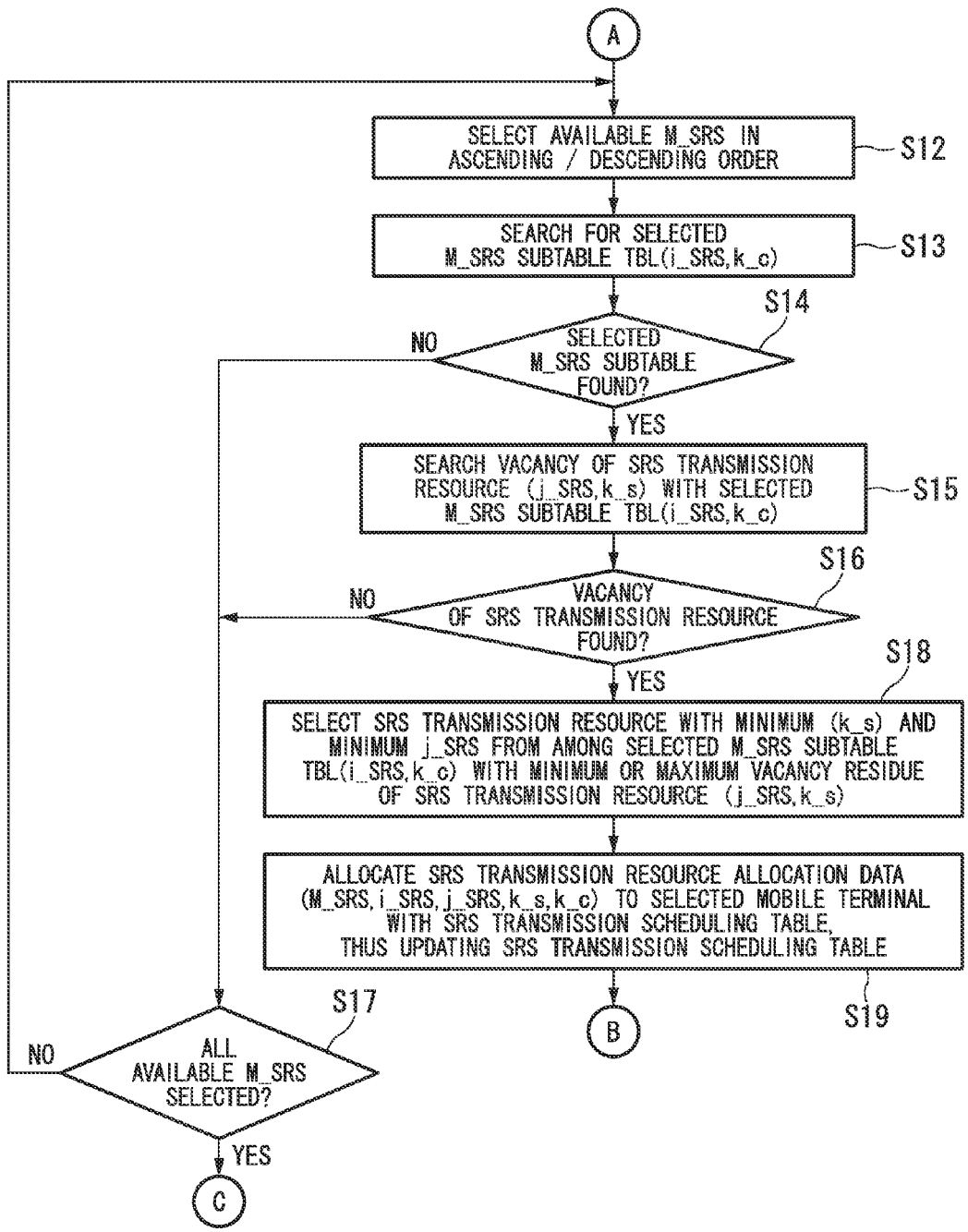
FIG. 9 A flowchart of an SRS transmission scheduling process.

In step S12 of FIG. 9, the SRS transmission resource allocation part 15 sequentially selects the values of the available SRS bandwidth (M_SRS) pertaining to the selected mobile terminal 4 in ascending order from smaller values to larger values. By sequentially selecting the values of the available SRS bandwidth in ascending order, it is possible to select as small a value of the SRS bandwidth as possible; hence, it is possible to increase the number of the mobile terminals 4 which the base station 1 executes the SRS transmission with.

In step S13, the SRS transmission resource allocation part 15 examines whether or not the subtable TBL(i_SRS,k_c) pertaining to the SRS bandwidth (M_SRS) selected in step S12 has been registered with the SRS transmission scheduling table 200. Specifically, the SRS transmission resource allocation part 15 examines whether or not a combination (i_SRS,k_c) consisting of the SRS transmission timing offset number (i_SRS) and the transmission comb number (k_c), pertaining to the SRS transmission setting information W_SRS(i_SRS,k_c) representing the selected SRS bandwidth, has been registered with the SRS transmission scheduling table 200. Thus, it is possible to select the subtable TBL(i_SRS,k_c) in relation to the combination of the SRS transmission timing offset number and the transmission comb number as well as the SRS transmission setting information representing the selected SRS bandwidth.

In step S14, the SRS transmission resource allocation part 15 makes a decision as to whether or not the subtable TBL (i_SRS,k_c) pertaining to the selected SRS bandwidth (M_SRS) has been registered with the SRS transmission scheduling table 200. The flow proceeds to step S15 when the above subtable TBL(i_SRS,k_c) is registered with the SRS transmission scheduling table 200. On the other hand, the flow directly proceeds from step S14 to step S17 when the subtable TBL(i_SRS,k_c) is not registered with the SRS transmission scheduling table 200.

In step S15, the SRS transmission resource allocation part 15 searches for vacancy of the SRS transmission resource (j_SRS,k_s) (i.e. a combination of the SRS band offset number j_SRS and the cyclic shift number k_s: see FIG. 6) in the subtable TBL(i_SRS,k_c) pertaining to the selected SRS bandwidth (M_SRS). In step S16, the SRS transmission resource allocation part 15 makes a decision as to whether or not a vacancy of the SRS bandwidth exists on the subtable TBL(i_SRS,k_c) pertaining to the selected SRS bandwidth. The flow proceeds to step S17 when no vacancy of the SRS transmission resource is found in the subtable TBL(i_SRS, k_c) pertaining to all the selected SRS bandwidths. On the other hand, the flow proceeds to step S18 when a vacancy of the SRS transmission resource is found in the subtable TBL (i_SRS,k_c) pertaining to at least one selected SRS bandwidth.

In step S17, a decision is made as to whether or not the SRS transmission resource allocation part 15 has selected all the SRS bandwidths (M_SRS) available in the selected mobile terminal 4. The flow proceeds to step S20 shown in FIG. 10 when the SRS transmission resource allocation part 15 has selected all the available SRS bandwidths. On the other hand, the flow returns to step S12 when an unselected one still exists in the available SRS bandwidths.

In step S18, the SRS transmission resource allocation part 15 selects the SRS transmission resource (j_SRS,k_s) with the minimum SRS band offset number (j_SRS) and the minimum cyclic shift number (k_s) from among the subtable TBL(i_SRS,k_c) with the minimum residue of the SRS transmission resource (j_SRS,k_s). This increases the number of the unused subtable TBL(i_SRS,k_c) and the SRS band offset number (j_SRS) with zero use count (k_s), so that it is possible to newly allocate SRS transmission resources with broad bandwidths. To alleviate interference between cyclic shifts, the SRS transmission resource allocation part 15 may select the SRS transmission resource (j_SRS,k_s) with the minimum SRS band offset number (j_SRS) and the minimum cyclic number (k_s) from the subtable TBL(i_SRS,k_c) with the maximum vacancy residue of the SRS transmission resource (j_SRS,k_s) in step S18.

In step S19, the SRS transmission resource allocation part 15 stores the terminal number of the selected mobile terminal 4, as the allocated terminal number 210, in the column of the SRS transmission resource (j_SRS,k_s) in the subtable TBL (i_SRS,k_c) which is selected in step S18. Thus, the SRS transmission resource allocation part 15 allocates the SRS transmission resource allocation data (i.e. the selected M_SRS, i_SRS, j_SRS, k_s, and k_c) to the selected mobile terminal 4. Then, the flow returns to step S4 shown in FIG. 8.

Figure 10:
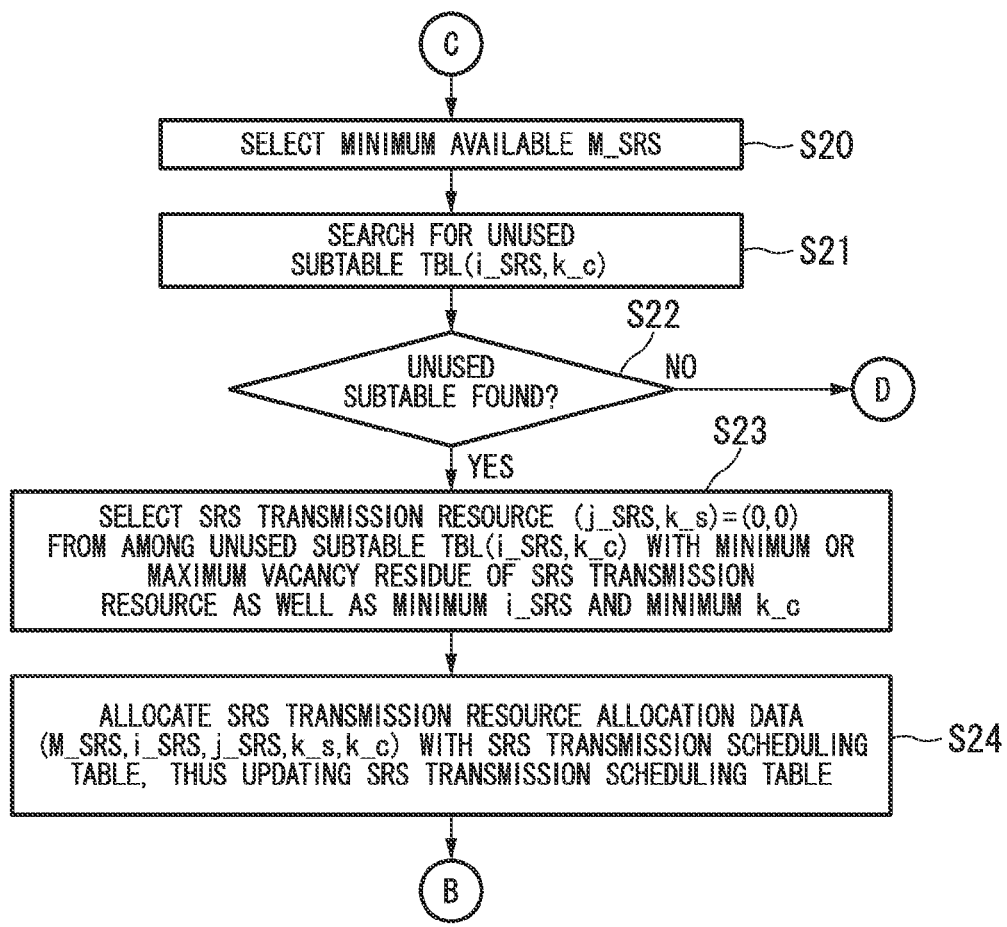
FIG. 10 A flowchart of an SRS transmission scheduling process.

The flow proceeds to step S20 shown in FIG. 10 when the subtable TBL(i_SRS,k_c) has not been allocated with respect to any one of the SRS bandwidths (M_SRS) available in the selected mobile terminal 4. In this case, it is necessary to provide a subtable TBL in relation to the minimum SRS bandwidth available in the selected mobile terminal 4. In step S20, the SRS transmission resource allocation part 15 selects the minimum SRS bandwidth (M_SRS) available in the selected mobile terminal 4.

In step S21, the SRS transmission resource allocation part 15 examines whether or not the unused subtable TBL(i_SRS, k_c) exists on the SRS transmission scheduling table 200. Specifically, the SRS transmission resource allocation part 15 searches through the SRS transmission scheduling table 200 so as to examine the existence/nonexistence of a combination (i_SRS,k_c) of the SRS transmission timing offset number (i_SRS) and the transmission comb number (k_c) with vacant SRS bandwidth setting information W_SRS(i_SRS,k_c). A subtable pertaining to the combination of the SRS transmission timing offset number and the transmission comb number with vacant SRS bandwidth setting information is regarded as an unused subtable.

In step S22, the SRS transmission resource allocation part 15 makes a decision on the existence/nonexistence of the unused subtable TBL(i_SRS,k_c). The flow proceeds to step S23 upon detecting the existence of the unused subtable. On the other hand, the flow proceeds to step S11 shown in FIG. 8 upon detecting the nonexistence of the unused subtable.

In step S23, the SRS transmission resource allocation part 15 selects the SRS transmission resource (j_SRS,k_s)=(0,0) (i.e. a combination of the SRS band offset number j_SRS and the cyclic shift number k_s both set at zero) from the unused subtable TBL(i_SRS,k_c) with the minimum transmission comb number (k_c) and the minimum SRS transmission timing offset number (i_SRS). This makes it possible to retain as many unused transmission combs as possible. Since it is likely to utilize unused transmission combs for the purpose of forwarding data other than SRS, it is possible to effectively use radio resources by retaining unused transmission combs.

In step S24, the SRS transmission resource allocation part 15 stores the terminal number of the selected mobile terminal 4, as the allocated terminal number 210, in the column of the SRS transmission resource (j_SRS,k_s)=(0,0) in the unused subtable TBL(i_SRS,k_c) which is selected in step S23. Additionally, the SRS transmission resource allocation part 15 sets the minimum SRS bandwidth M_SRS to the SRS bandwidth setting information W_SRS pertaining to the unused subtable TBL. This allows the unused subtable to link with the minimum SRS bandwidth of the selected mobile terminal 4. Based on the SRS transmission resource (j_SRS, k_s)=(0,0) of the subtable pertaining to the minimum SRS bandwidth, the SRS transmission resource allocation part 15 allocates the SRS transmission resource allocation data (i.e. the minimum M_SRS, i_SRS, j_SRS=0, k_s=0, and k_c) to the selected mobile terminal 4. Then, the flow proceeds to step S4.

As described above, the present embodiment defines the range of the SRS bandwidth on the basis of the maximum value of the SRS bandwidth based on the maximum transmission-enabled power of the mobile terminal 4 and the minimum value of the SRS bandwidth based on the mobility of the mobile terminal 4. Thus, it is possible to allocate SRS transmission resources in consideration of the current circumstances of the mobile terminals 4.

The present embodiment is able to effectively use SRS transmission resources because SRS transmission resources are allocated to the mobile terminals 4 only when the range of the SRS bandwidth can be defined based on the minimum value and the maximum value of the SRS bandwidth.

Additionally, the present embodiment is able to employ as small a value of the SRS bandwidth as possible because SRS bandwidths are sequentially selected from the range of the SRS bandwidth, which is defined based on the minimum value and the maximum value of the SRS bandwidth, in ascending order. This increases the number of the mobile terminals 4 subjected to SRS transmission.

Furthermore, the present embodiment is able to retain as many unused SRS transmission resources (i.e. cyclic shifts and transmission combs) as possible by selecting combinations minimizing the residue of the same SRS transmission resource. By increasing unused SRS transmission resources, it becomes easy to newly allocate SRS transmission resources with broad bandwidths.

Figure 11:
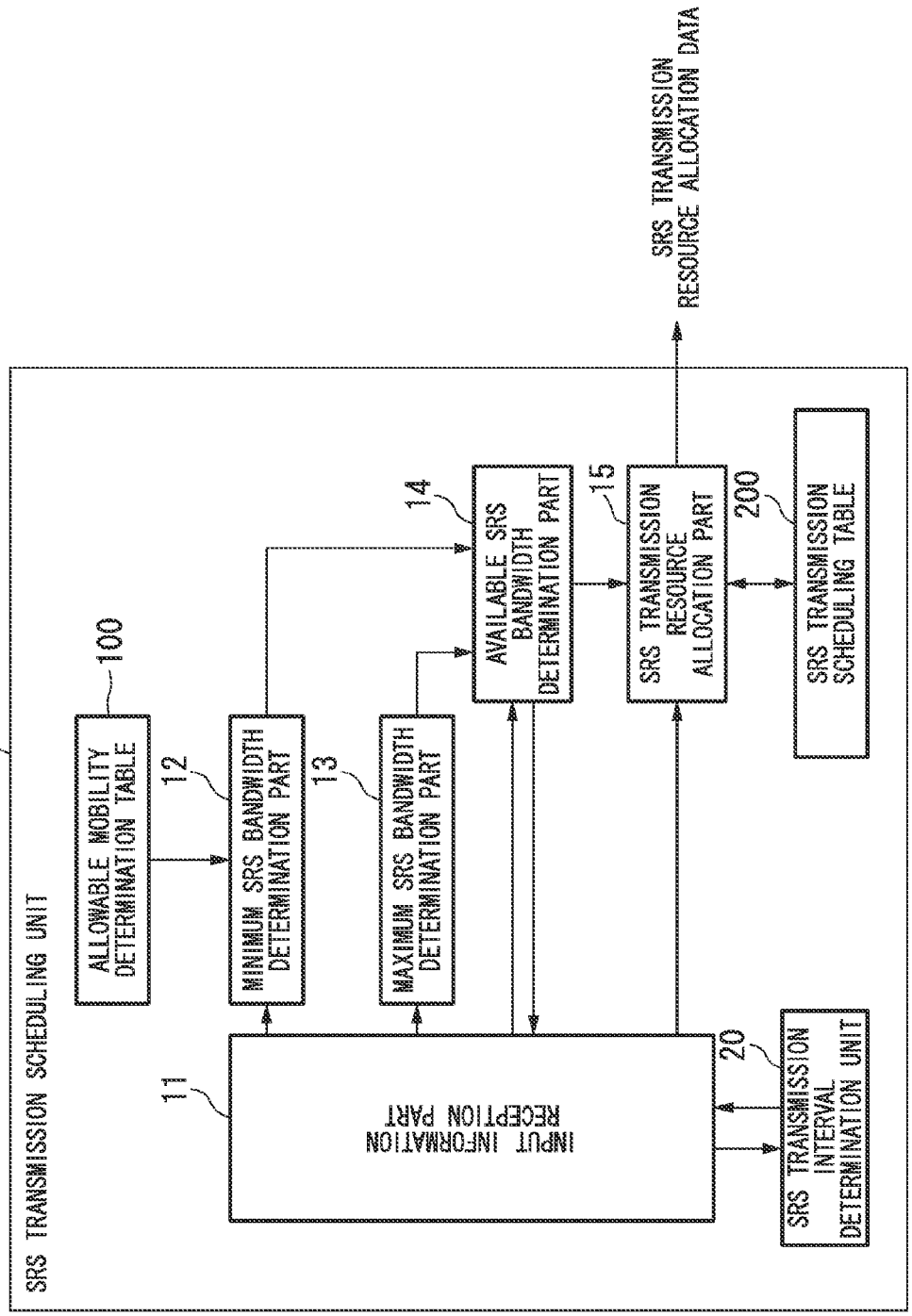
FIG. 11 A block diagram of a modification of the SRS transmission scheduling unit shown in FIG. 3.
Figure 12:
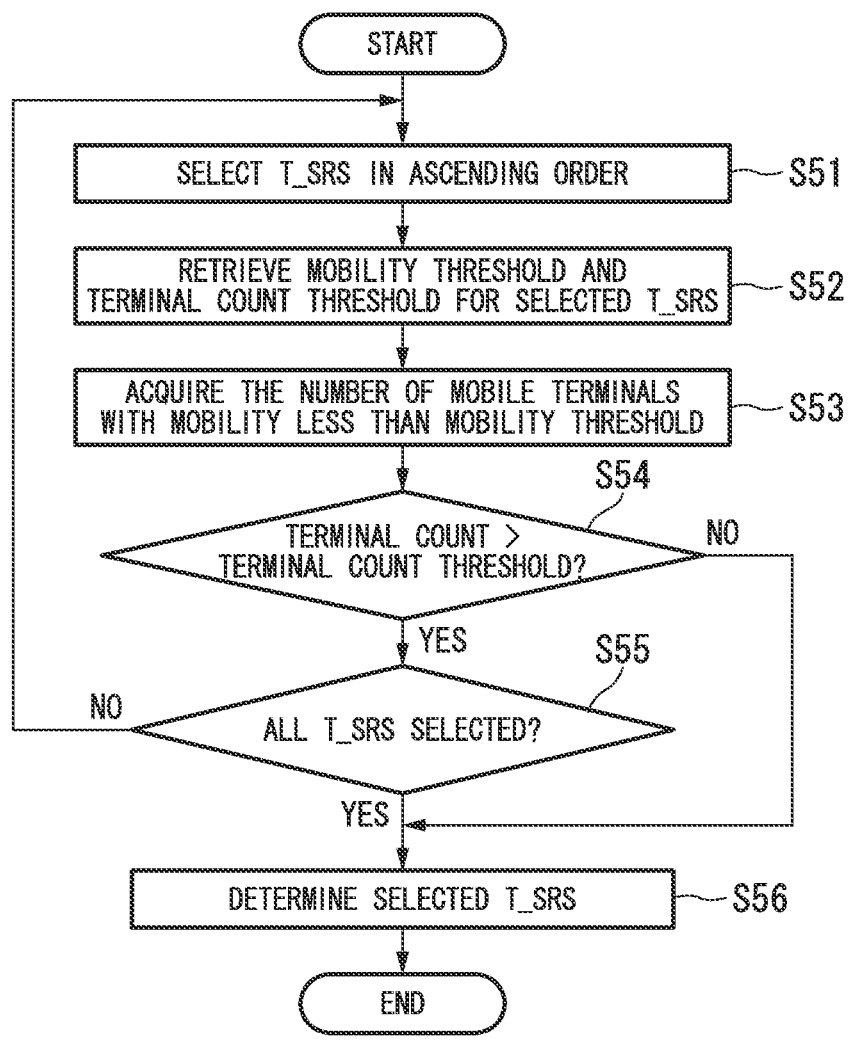
FIG. 12 A flowchart showing an SRS transmission interval determination process executed by an SRS transmission interval determination part shown in FIG. 11.

FIG. 11 is a block diagram showing a modification of the SRS transmission scheduling unit 2 shown in FIG. 3. Compared to the constitution of FIG. 3, the constitution of FIG. 11 additionally provides an SRS transmission interval determination part 20, thus enabling automatic setting of the SRS transmission interval. FIG. 12 is a flowchart of an SRS transmission interval determination process.

Upon starting the SRS transmission scheduling process due to the predetermined initiation, the input information reception part 11 instructs the SRS transmission interval determination part 20 to determine the SRS transmission interval. In step S51 of FIG. 12, the SRS transmission interval determination part 20 sequentially selects eight candidates of the SRS transmission interval T_SRS, namely "2 ms, 5 ms, 10 ms, 20 ms, 40 ms, 80 ms, 160 ms, 320 ms", in ascending order from smaller values to larger values.

In step S52, the SRS transmission interval determination part 20 acquires the mobility threshold and the terminal number threshold with respect to the selected SRS transmission interval T_SRS. That is, the SRS transmission interval determination part 20 obtains eight types of mobility thresholds and terminal count thresholds in correspondence with eight types of the SRS transmission interval T_SRS.

In step S52, the SRS transmission interval determination part 20 retrieves the number of mobile terminals 4 (i.e. "terminal count") whose mobility is less than the mobility threshold from the input information reception part 11. In step S54, the SRS transmission interval determination part 20 makes a decision as to whether or not "terminal count>terminal count threshold" is established. The flow proceeds to step S55 when the decision expression is established, whilst the flow proceeds to step S56 when the decision expression is not established.

In step S55, a decision is made as to whether or not the SRS transmission interval determination part 20 has selected all the values of the SRS transmission interval T_SRS. The flow proceeds to step S56 when the SRS transmission interval determination part 20 has selected all the values of the SRS transmission interval, whilst the flow returns to step S51 when one of the values of the SRS transmission interval remains unselected. In step S56, the SRS transmission interval determination part 20 notifies the selected SRS transmission interval T_SRS to the input information reception part 11.

Figure 13:
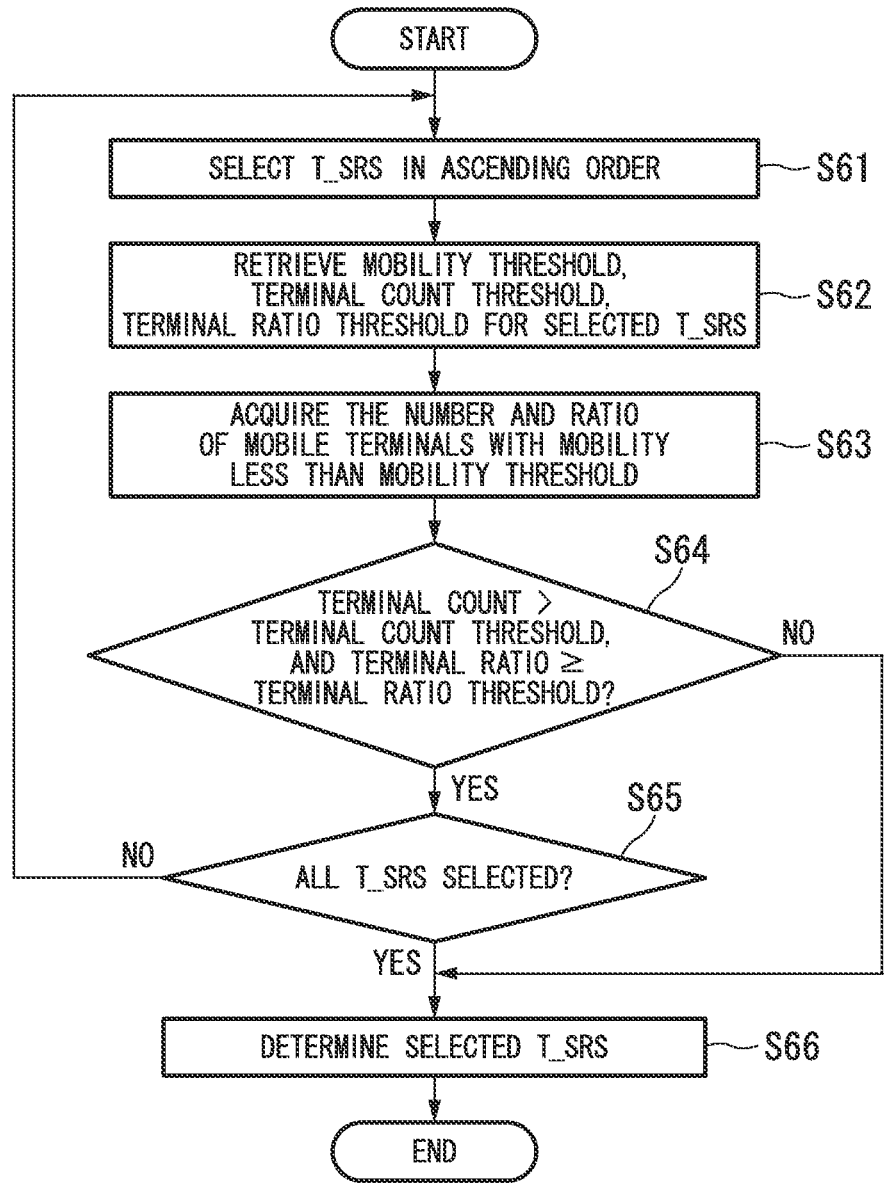
FIG. 13 A flowchart of a modification of the SRS transmission interval determination process shown in FIG. 12.

FIG. 13 is a flowchart showing a modification of the SRS transmission interval determination process shown in FIG. 12

In step S61 of FIG. 13, the SRS transmission interval determination part 20 sequentially selects eight candidates of the SRS transmission interval T_SRS, namely "2 ms, 5 ms, 10 ms, 20 ms, 40 ms, 80 ms, 160 ms, 320 ms", in ascending order from smaller values to larger values.

In step S62, the SRS transmission interval determination part 20 acquires the mobility threshold and the terminal count threshold with respect to the selected SRS transmission interval T_SRS. That is, the SRS transmission interval determination part 20 obtains eight types of mobility thresholds and terminal count thresholds in correspondence with eight candidates of the SRS transmission interval T_SRS.

In step S63, the SRS transmission interval determination part 20 retrieves the number of mobile terminals 4 (i.e. "terminal count") whose mobility is less than the mobility threshold and its ratio (i.e. "terminal ratio"). In step S64, the SRS transmission interval determination part 20 makes a decision as to whether or not "terminal count>terminal count threshold" and "terminal ratio terminal ratio threshold" are established. The flow proceeds to step S65 when the decision expressions are established, whilst the flow proceeds to step S66 when the decision expressions are not established.

In step S65, a decision is made as to whether or not the SRS transmission interval determination part 20 has selected all the values of the SRS transmission interval T_SRS. The flow proceeds to step S66 when the SRS transmission interval determination part 20 has selected all the values of the SRS transmission interval, whilst the flow returns to step S61 when one of the values of the SRS transmission interval remains unselected. In step S66, the SRS transmission interval determination part 20 notifies the selected SRS transmission interval T_SRS to the input information reception part 11.

Since the SRS transmission scheduling unit 2 includes the SRS transmission interval determination part 20 to execute the SRS transmission interval determination process, it is possible to automatically determine SRS transmission intervals considering the current circumstances of the mobile terminals 4 upon realizing allocation of SRS transmission resources. This alleviates an operator's load in the base station 1.

Programs implementing the contents of the flowcharts shown in FIGS. 8, 9, 10, 12, and 13 can be recorded in computer-readable recording media. That is, computer systems may load and execute programs recorded in recording media so as to execute the SRS transmission scheduling process and the SRS transmission interval determination process. The term "computer system" may encompass software such as operating system (OS) and hardware such as peripheral devices.

As the "computer-readable recording media", it is possible to name flexible disks, magneto-optic disks, ROM, rewritable nonvolatile memory such as flash memory, portable recording media such as DVD (Digital Versatile Disk), and memory devices such as hard disks installed in computers. Additionally, the "computer-readable recording media" may encompass networks such as the Internet, and any devices retaining programs for a certain time such as nonvolatile memory (e.g. DRAM (Dynamic Random Access Memory)) of computer systems serving as servers and clients receiving programs transmitted thereto via telephone lines and communication lines.

The computer system whose storage device stores the foregoing programs may transmit those programs to another computer system via transmission media or transmission waves. The "transmission media" used for transmission of programs may refer to networks such as the Internet, and any media having information transmitting functions such as telephone lines and communication lines.

The foregoing programs do not necessarily reproduce the complete processing of the SRS transmission scheduling process and the SRS transmission interval determination process, but they can achieve a part of their functions. Alternatively, differential files (or differential programs), which are combined with preinstalled programs of computer systems so as to achieve the complete processing content of the present embodiment, can be recorded in recording media or transmitted via transmission media.

The present invention is not necessarily limited to the foregoing embodiment and modifications; hence, the present invention may embrace any variations that fall within the scope of the invention as defined by the appended claims.

INDUSTRIAL APPLICABILITY

The present invention is able to dynamically allocate SRS transmission resources to mobile terminals in consideration of the current circumstances of mobile terminals in the OFDMA-standard radio communication system, so that the present invention provides the optimum SRS transmission scheduling functions applied to base stations.

DESCRIPTION OF THE REFERENCE NUMERALS 1 base station
2 SRS transmission scheduling unit
3 SRS transmission resource notification unit
4 mobile terminal
11 input information reception part
12 minimum SRS bandwidth determination part
13 maximum SRS bandwidth determination part
14 available SRS bandwidth determination part
15 SRS transmission resource allocation part
20 SRS transmission interval determination part
100 allowable mobility determination table
200 SRS transmission scheduling table

The invention claimed is:

1. A reference signal transmission scheduling device that performs scheduling on uplink transmission of a reference signal (SRS) from a mobile terminal to a base station in a radio communication system, said reference signal transmission scheduling device comprising:
a maximum SRS bandwidth determination part that calculates a maximum value of an SRS bandwidth based on a maximum transmission-enabled power of the mobile terminal;
a minimum SRS bandwidth determination part that calculates a minimum value of the SRS bandwidth based on a mobility of the mobile terminal; and
an SRS transmission resource allocation part that determines the SRS bandwidth, which is actually used by the mobile terminal subjected to SRS transmission resource allocation, within a range between the maximum value and the minimum value of the SRS bandwidth.

2. The reference signal transmission scheduling device according to claim 1, wherein the SRS transmission resource allocation part allocates an SRS transmission resource to the mobile terminal only when the SRS bandwidth is defined within the range between the maximum value and the minimum value with respect to the mobile terminal subjected to SRS transmission resource allocation.

3. The reference signal scheduling device according to claim 1, wherein the SRS resource is allocated to the mobile terminal by use of the maximum value of the SRS bandwidth when the maximum value of the SRS bandwidth decreases to be lower than the minimum value.

4. The reference signal transmission scheduling device according to claim 1, wherein the SRS transmission resource allocation part sequentially selects values of the SRS bandwidth, within the range defined between the maximum value and the minimum value of the SRS bandwidth, in ascending order or descending order.

5. The reference signal transmission scheduling device according to claim 1, wherein the SRS transmission resource allocation part selects a desired SRS transmission resource from among available SRS transmission resources within the range defined between the maximum value and the minimum value of the SRS bandwidth such that a residue of the same SRS transmission resource is maximized or minimized.

6. The reference signal transmission scheduling device according to claim 1 further comprising an allowable mobility determination table that determines an allowable mobility with respect to a pair of an SRS transmission interval and the SRS bandwidth.

7. The reference signal transmission scheduling device according to claim 1 further comprising an SRS transmission interval determination part that determines an SRS transmission interval based on a number of mobile terminals whose mobility is below a predetermined mobility threshold.

8. The reference signal transmission scheduling device according to claim 6, wherein the SRS transmission interval determination part determines the SRS transmission interval based on a ratio and a number of mobile terminals whose mobility is below the predetermined mobility threshold.

9. A reference signal transmission scheduling method that performs scheduling on uplink transmission of a reference signal (SRS) from a mobile terminal to a base station in a radio communication system, said reference signal transmission scheduling method comprising:
calculating a maximum value of an SRS bandwidth based on a maximum transmission-enabled power of the mobile terminal;
calculating a minimum value of the SRS bandwidth based on a mobility of the mobile terminal; and
determining the SRS bandwidth, which is actually used by the mobile terminal subjected to SRS transmission resource allocation, within a range between the maximum value and the minimum value of the SRS bandwidth.

10. A non-transitory computer program implementing a reference signal transmission scheduling process for performing scheduling on uplink transmission of a reference signal (SRS) from a mobile terminal to a base station in a radio communication system, said computer program comprising:
calculating a maximum value of an SRS bandwidth based on a maximum transmission-enabled power of the mobile terminal;
calculating a minimum value of the SRS bandwidth based on a mobility of the mobile terminal; and
determining the SRS bandwidth, which is actually used by the mobile terminal subjected to SRS transmission resource allocation, within a range between the maximum value and the minimum value of the SRS bandwidth.

* * * * *